(12) United States Patent
Whitman

(10) Patent No.: US 11,804,630 B2
(45) Date of Patent: *Oct. 31, 2023

(54) BATTERY SYSTEM WITH THERMAL CONTROL LOOP

(71) Applicant: Hamilton Sundstrand Corporation, Charlotte, NC (US)

(72) Inventor: Chase Whitman, Mandeville, LA (US)

(73) Assignee: Hamilton Sundstrand Corporation (HSC), Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/485,269

(22) Filed: Sep. 24, 2021

(65) Prior Publication Data

US 2022/0102781 A1    Mar. 31, 2022

Related U.S. Application Data

(60) Provisional application No. 63/084,341, filed on Sep. 28, 2020.

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/425* (2013.01); *H01M 10/482* (2013.01); *H01M 10/486* (2013.01); *H01M 10/613* (2015.04); *H01M 10/625* (2015.04); *H01M 10/657* (2015.04); *H01M 10/6551* (2015.04); *H01M 50/216* (2021.01); *H01M 50/249* (2021.01); *H01M 50/269* (2021.01); *H01M 2010/4271* (2013.01); *H01M 2220/20* (2013.01)

(58) Field of Classification Search
CPC ............. H01M 10/613; H01M 10/625; H01M 10/6551; H01M 10/657; H01M 10/425; H01M 10/482; H01M 50/249; H01M 50/269; H01M 50/216
See application file for complete search history.

(56) References Cited

U.S. PATENT DOCUMENTS 9,093,726 B2   7/2015 Prilutsky et al.
9,467,000 B2   10/2016 Rivera-Poventud et al.
(Continued)

FOREIGN PATENT DOCUMENTS

DE   102008034855 A1 * 1/2010 ........ H01M 10/0436
DE   102008034855 A1   1/2010

OTHER PUBLICATIONS

Extended European Search Report dated Feb. 18, 2022, issued during the prosecution of European Patent Application No. EP 21199553.5, 6 pages.

*Primary Examiner* — Karie O'Neill Apicella
(74) *Attorney, Agent, or Firm* — Locke Lord LLP; Alicia Carroll; Gabriella D'Angelo

(57) ABSTRACT

A battery cell system includes a plurality of battery cells having an annular shape abutting one another to form a battery cell stack with an annular shape to facilitate cooling. The battery cell system includes a stack interface having an annular housing operatively connected to the plurality of battery cells. A cooling loop is defined about the battery cell stack and the stack interface and through central through holes of the battery cell stack and the stack interface.

10 Claims, 3 Drawing Sheets

(51) Int. Cl.
*H01M 10/625* (2014.01)
*H01M 10/6551* (2014.01)
*H01M 10/657* (2014.01)
*H01M 50/249* (2021.01)
*H01M 50/269* (2021.01)
*H01M 50/216* (2021.01)
*H01M 10/42* (2006.01)
*H01M 10/48* (2006.01)

(56) References Cited

U.S. PATENT DOCUMENTS

| | | |
|---|---|---|
| 9,525,290 B2 | 12/2016 | Snyder |
| 9,806,325 B2 | 10/2017 | Woehrle et al. |
| 9,912,021 B2 | 3/2018 | Andres |
| 10,141,613 B2 | 11/2018 | Schaffner et al. |
| 10,547,183 B2 | 1/2020 | Halsey |
| 10,608,292 B2 | 3/2020 | Yang et al. |
| 10,608,299 B2 | 3/2020 | Newman |
| 10,629,967 B2 | 4/2020 | Seo et al. |
| 2003/0198864 A1* | 10/2003 | Vigier ............... H01M 10/6566 429/82 |
| 2016/0261127 A1* | 9/2016 | Worry ............... G01R 31/3842 |
| 2016/0380247 A1 | 12/2016 | Juzkow et al. |
| 2020/0036047 A1 | 1/2020 | Aikens et al. |
| 2020/0212507 A1 | 7/2020 | Shimizu et al. |
| 2020/0333377 A1* | 10/2020 | Kim ..................... H01M 10/48 |

* cited by examiner

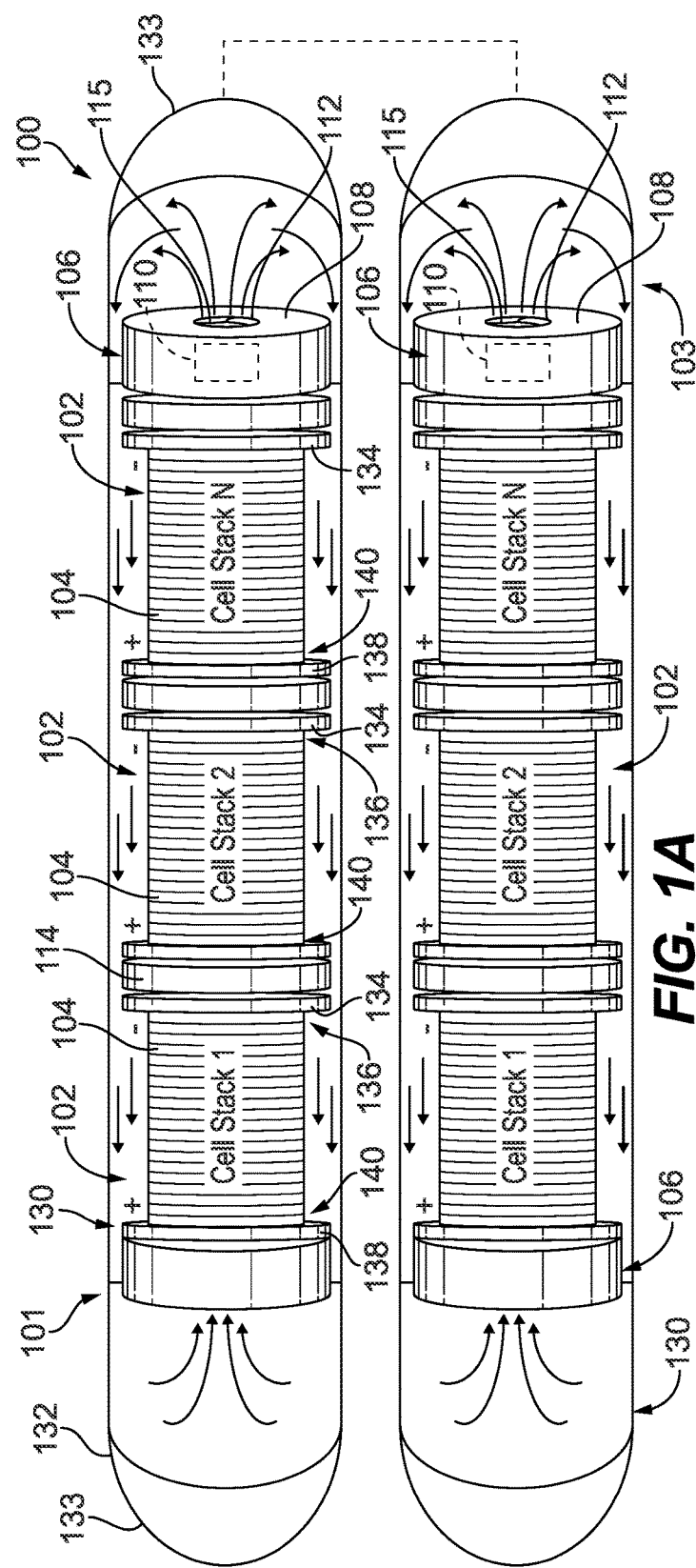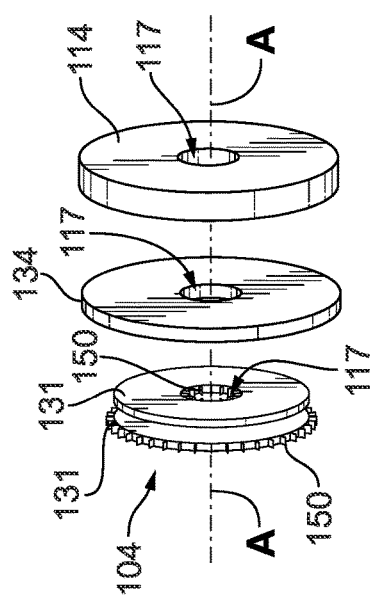
FIG. 1A
FIG. 1B

BATTERY SYSTEM WITH THERMAL CONTROL LOOP

CROSS-REFERENCE TO RELATED APPLICATIONS

This application claims priority to and the benefit of U.S. Provisional Application No. 63/084,341, filed Sep. 28, 2020, the entire contents of which are herein incorporated by reference in their entirety.

BACKGROUND

1. Field

The present disclosure relates to energy storage such as batteries, and more particularly to energy storage such as batteries for use in aircraft, including more-electric, hybrid-electric, and full-electric aircraft.

2. Description of Related Art

High-energy dense battery cells for use on hybrid electric or full electric aircraft, such as lithium ion (Li-Ion) cells, can potentially pose a fire hazard risk due to thermal runaway between the anode and cathode active materials. Additionally, high-energy dense batteries have numerous inherent failure modes inside the cell. When considering the use of such cells for aviation, hundreds of cells, if not more, are traditionally used to meet system voltage and energy requirements. The need for reliability and safety tends to result in high-weight systems, which can be undesirable in aerospace applications.

The conventional techniques have been considered satisfactory for their intended purpose. However, there is an ever present need for improved systems and methods for packaging and using high specific energy battery cells in a safe manner with reduced weight. This disclosure provides a solution for this need.

SUMMARY

A battery cell system includes a plurality of battery cells having an annular shape abutting one another to form a battery cell stack with an annular shape to facilitate cooling. The battery cell system includes a stack interface having an annular housing operatively connected to the plurality of battery cells. A cooling loop is defined about the battery cell stack and the stack interface and through central through holes of the battery cell stack and the stack interface.

In accordance with some embodiments, the system includes a first annular metallic conductor positioned at a first end of the battery cell stack and a second annular metallic conductor positioned at a second end of the battery cell stack. The system can include a plurality of sensors positioned within at least one of the battery cells. The plurality of sensors can include at least one of a temperature sensor, a voltage sensor, and a pressure sensor. The plurality of sensors can be operatively connected to a battery management system (BMS).

The battery cells can be hermetically sealed. The battery cell stack is a 520 volt stack and includes 145 battery cells. The stack interface can include a plurality of heat dissipating field effect transistors (FETs). The stack interface can define an inner perimeter and an outer perimeter. The heat dissipating FETs can be positioned more proximate to the outer perimeter than the inner perimeter and are circumferentially spaced apart along the outer perimeter. The stack interface can include a mechanical switch device configured and adapted to selectively connect or disconnect one of the battery cell stack from an adjacent battery cell stack.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1A is a schematic cross-sectional side perspective view of a battery cell system constructed in accordance with the present disclosure, showing the stacks of cells, main BMS and stack interfaces;

FIG. 1B is an exploded perspective view of a portion of the battery cell system of FIG. 1A, showing a portion of the battery cell stack, a conductor and a stack interface;

DETAILED DESCRIPTION OF THE PREFERRED EMBODIMENTS

Figure 2:
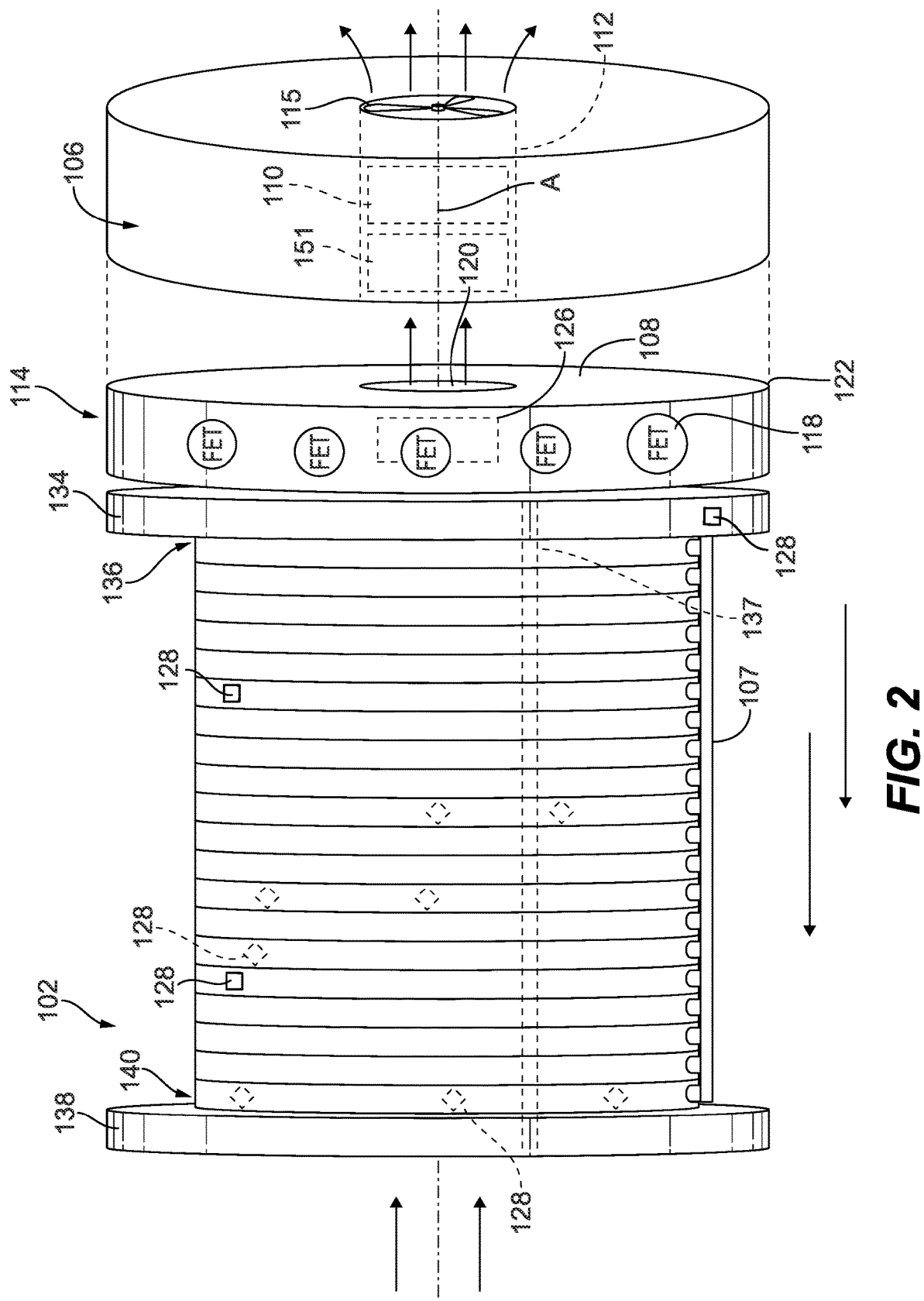
FIG. 2 is a schematic side perspective view of a portion of the battery cell system of FIG. 1A, showing one of the stacks of cells and the main BMS shown partially removed therefrom.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1A and is designated generally by reference character 100. Other embodiments of systems in accordance with the disclosure, or aspects thereof, are provided in FIGS. 1B-3, as will be described. The systems and methods described herein can provide battery systems with improved communication, components having an annular shape to improve thermal control, and improved cooling to not only cool a battery cell or system, but also target and prevent and/or extinguish a battery thermal runaway in volume and weight sensitive applications.

As shown in FIGS. 1A-1B, a battery system 100 includes a plurality of annular battery cells 104 abutting one another to form a battery cell stack 102. System 100 includes a plurality of battery cell stacks 102, e.g. stacks of battery cells 104. A housing 131 of each battery cell 104 is shaped as a shallow cylindrical annulus and abut one another to form a given stack 102 with an annular shape, e.g. a cylindrical annulus, to facilitate cooling. A main battery management system (BMS) 106 is operatively connected to at least one of the stacks 102 of battery cells 104. The main BMS 106 includes an annular housing 108, e.g. shaped as a shallow cylindrical annulus, and a motor drive assembly 110 positioned within an inner diameter hole 112 of the annular housing 108 configured and adapted to drive circulation of a heat transfer fluid around the plurality of stacks 102. The motor drive assembly 110 includes a fan 115 or other fluid mover to effect the movement. The motor drive assembly 110 and main BMS manages thermal stability of the system 100. The battery system 100 includes system housing 130 that surrounds the plurality of stacks 102 and the main BMS 106. The main BMS 106 is modular and can be added to the front and/or rear of the housing 130 as needed to achieve proper levels of redundancy. The main BMS 106 is operatively connected to each stack interface 114, as described in more detail below.

As shown in FIG. 2, the battery system 100 includes a fluid-to-fluid heat exchanger matrix 151 inside the inner diameter hole 112 to either transfer heat into the heat transfer fluid within housing 130 for battery cell stack warming, or out of the fluid for battery cell stack cooling. As fluid is drawn through inner diameter hole 112 by fan 115 (which is downstream from heat exchanger matrix 151) the fluid within housing 130 is heated or cooled by the fluid within the heat exchange matrix 151 (which is fluidically isolated from the fluid within housing 130). The fluid in the heat exchanger matrix 151 is fluidically connected to a source of heating outside of system 100 such as a thermal engine or electrical heater or a source of cooling such as a radiator, to enable the BMS to maintain stack temperatures within acceptable limits.

With continued reference to FIGS. 1A-2, the battery system 100 includes a plurality of first annular metallic conductors 134 each positioned at a first end 136 of a respective stack 102 of battery cells 104 and a plurality of second annular metallic conductors 138 each positioned at a second end 140 of a respective stack 102 of battery cells 104 of the plurality of stacks 102 of battery cells 104. Conductors 134 and 138 serve as a contactor plate and pressure plate to provide a more evenly distributed compression for the stack 102. Bolts or struts 137 are strutted from one conductor 134 to the other 138 to force face contact between abutting cells 104 ensuring maximum contact surface is achieved. The annular shaped stack-up formed by the stack of battery cells 104, conductors 134 and 138, stack interfaces 114 (described below), and BMS 106 defines a central hole 117 for carrying a heat transfer fluid and/or coolant that creates a protective thermal barrier around all system surfaces in a thermal loop arrangement, as indicated schematically by the flow arrows. The thermal loop goes through the center hole 117 of the stack-up and out one end, around an outer perimeter of the stack-up, between the stack-up and the housing 130, and around to the opposite end of the stack-up back through the center hole 117. This thermal loop enables rapid charge of the cells 104 and fire abatement.

As shown in FIG. 1B, battery cells 104 can include cooling fins, metal foams or other surface projections 150 extending into the center hole 117 or extending from the outer perimeter of cells 104 to improve heat transfer between the heat transfer liquid/coolant and the cells 104. Projections 150 can similarly be included on conductors 134/138 or stack interfaces 114. In some embodiments, the heat transfer fluid can serve as coolant and fire arresting agent if/when the main BMS 106 detects issues. Since the coolant and retardant are one and the same fluid, the battery system 100 is lighter and simpler than systems where a separate coolant supply and retardant supply are needed. The heat transfer fluid maintains even thermal gradient enabling longer life and helps to maintain state of health (SOH) for a longer life.

With reference now to FIGS. 1A-2, in the event of a thermal runaway of a single cell 104 due to internal failure, the rate of transfer of heat from the cell 104 to the fluid would increase naturally without any action by the BMS 106 or the sBMS 126, due to the increased difference in temperature between the cell and the fluid. If the rate of cooling possible with the cooling projections 150, e.g. fins, metal foam, etc., and normal fluid circulation rate is insufficient and the BMS 106 or sBMS 126 detects a problem a method of controlling heat transfer in a battery system is available. A method of controlling heat transfer in a battery system, e.g. battery system 100, includes monitoring at least one characteristic of a battery cell, e.g. battery cell 104, within the battery system with a battery management system (BMS), e.g. main BMS 106 or sBMS 126.

With continued reference to FIGS. 1A-2, the method includes sending information from the at least one sensor to the BMS with an optical communication link, e.g. optical communication link 107. The optical communication link is connected to each of the plurality of battery cells. The method includes selectively varying a fluid circulation rate in the battery system with the BMS depending on the at least one characteristic. Selectively varying the fluid circulation rate includes increasing the fluid circulation rate with the BMS if at least one of the at least one characteristic indicates thermal runaway in the battery cell to increase. In this way, the BMS acts to increase the cooling available and minimize propagation of thermal runaway to another battery cell within the battery system. Increasing the fluid circulation rate includes sending a rate increase signal from the BMS to a motor drive assembly, e.g. motor drive assembly 110, having a fluid mover, e.g. fan 115, propeller, or the like, to increase a circulation rate of a heat transfer fluid within the battery system. Selectively varying the fluid circulation rate in the battery system includes decreasing the fluid circulation rate with the BMS if at least one of the characteristics indicates a low temperature in the battery cell. The characteristics of the battery cell include at least one of electrical characteristics (e.g. voltage), temperature, pressure, or the presence of characteristic gases. These characteristics can be measured with sensors, e.g. sensors 128, which are described in more detail below.

As shown in FIG. 1A, the system housing 130 forms a pill-shaped pod 101 with an outer surface 132 free of vertices, except for the features that may be required for mounting and attaching the battery system. Pod 101 can also be a cylindrical shape, which is similar to the pill shape shown except that the pod 101 would have flat ends instead of the arcuate ends. The aerodynamic structure allows for maximum scalability, modularization, and thermal control. The aerodynamic shape permits placement of system 100 exterior to the fuselage, e.g. on a wing, or interior. Those skilled in the art will readily appreciate that a variety of aerodynamic housings can be used. Housing 130 includes removable end caps 133 to allow for stack 102 replacement. Stack 102 is removable from housing 130 and cells 104 are removable from the stack 102.

With reference now to FIGS. 1A-2, the battery system 100 includes stack interfaces 114 having an annular shape, e.g. shaped as a shallow cylindrical annulus. Each stack interface 114 has an annular housing and is operatively connected to an end 116 of a respective stack 102 and is operatively connected to the battery cells 104 in the stack 102. The annular housing defines a center (aligned with longitudinal axis A) and an outer perimeter 122. A cooling loop is defined about each battery cell stack 102 and its respective stack interface 114 and through central through holes 117 of the battery cell stack 102 and the stack interface 114. Each stack interface 114 includes a plurality of heat dissipating field effect transistors (FETs) 118. Each stack interface 114 includes an inner perimeter 120. The heat dissipating FETs 118 are positioned more proximate to the outer perimeter 122 than the inner perimeter 120 and/or the center and are circumferentially spaced apart along the outer perimeter 122 about a stack axis A. The FETs 118 dissipate heat in a more efficient manner due to their placement along the outer perimeter 122. Each stack interface 114 acts as an isolation plate and includes at least one mechanical switch device 124, such as a chemically and/or thermally activated/deactivated mechanical contactor configured and adapted to selectively connect or disconnect one of the stacks 102 of battery cells 104 from other adjacent stacks 102 of battery cells 104. The mechanical switch device 124 is intrinsic to the stack interface 114 and the position therein can vary depending on the specific design of stack interface 114. The isolation plate is positioned between each stack assembly (module) and houses the mechanical switch devices 124. The mechanical switch device 124 (as opposed to electrical switches, or the like) permits reliable and quick automatic high-voltage disconnect and lock-out.

As shown in FIG. 2, each stack interface 114 includes a BMS, e.g. a secondary battery management system (sBMS) 126. The sBMS is operatively connected to a plurality of sensors 128 positioned within the housing 131 of each battery cell 104 and the main BMS 106 either by way of a single optical communication link 107 or by conventional electrical connections. Sensors 128 are configured and adapted to send data regarding at least one characteristic of a given battery cell 104 to sBMS 126 and/or the main BMS 106. Sensors 128 within each cell 104 enable cell monitoring of every cell 104 in the system, which permits early detection of thermal runaway or other failure modes. Optical communication link 107 reduces weight and increases ease of assembly as there are no high-voltage flex cables or wire harnesses required. The sensors 128 can include one or more of temperature, particulate/gas monitoring devices, voltage and/or pressure sensors and they are integrated within the cell itself. Additional sensors 128 can be positioned outside of cells 104. Cells 104 are hermetically sealed and include glass feed-throughs for communications isolation.

With continued reference to FIG. 2, optical communication link 107 is operatively connected to each battery cell 104 in a stack 102 to communicate signals (information or power) from sensors 128 within each cell 104 via optical cable to the sBMS 126 and/or from the sBMS 126 to sensors 128. The sBMS 126 can provide processing and/or signal conditioning to the signals from sensors 128. The sBMS 126 is then connected to the main BMS via optical, wireless or other form of communication link. That way, the main BMS 106 is operatively connected to at least one sensor 128 within at least one of the battery cells 104 via the sBMS for a given stack 102 and can monitor multiple stacks 102. The optical communication link 107 is connected to the sBMS 126 and then to the main BMS 106 in FIGS. 1 and 2, but it is also contemplated that optical communication link 107 can connect sensors 128 directly to the main BMS 106. The main BMS 106 identifies a failure mode and the appropriate corrective action that can be taken, e.g., increased cooling, repair, mechanical disconnect, or the like.

A method for detecting an mitigating failure modes in a battery cell, e.g. battery cell 104, includes reading a battery cell characteristic with a sensor, e.g. sensor 128, positioned within an outer housing, e.g. outer housing 131, of the battery cell. The method includes sending the battery cell characteristic to a battery management system (BMS), e.g. BMS 106 and/or sBMS 126. The method includes determining whether the battery cell characteristic meets a criteria with the BMS. The method includes signaling a failure mode if the battery cell characteristic does not meet the criteria. The method can include initiating a disconnect between the subject stack of battery cells, e.g. stack 102, and a remaining portion of the stacks of battery cells, or other maintenance action, if the failure mode is signaled.

As shown in FIG. 1A, the battery system 100 includes a second system housing 130 that surrounds a second set of the plurality of stacks 102 and a second main BMS 106 to form a second battery pod 103. The second set of the plurality of stacks 102 is the same as the first, and the second main BMS 106 is also the same as the first main BMS. The second battery pod 103 is connected to the first battery pod 101 in series.

Figure 3:
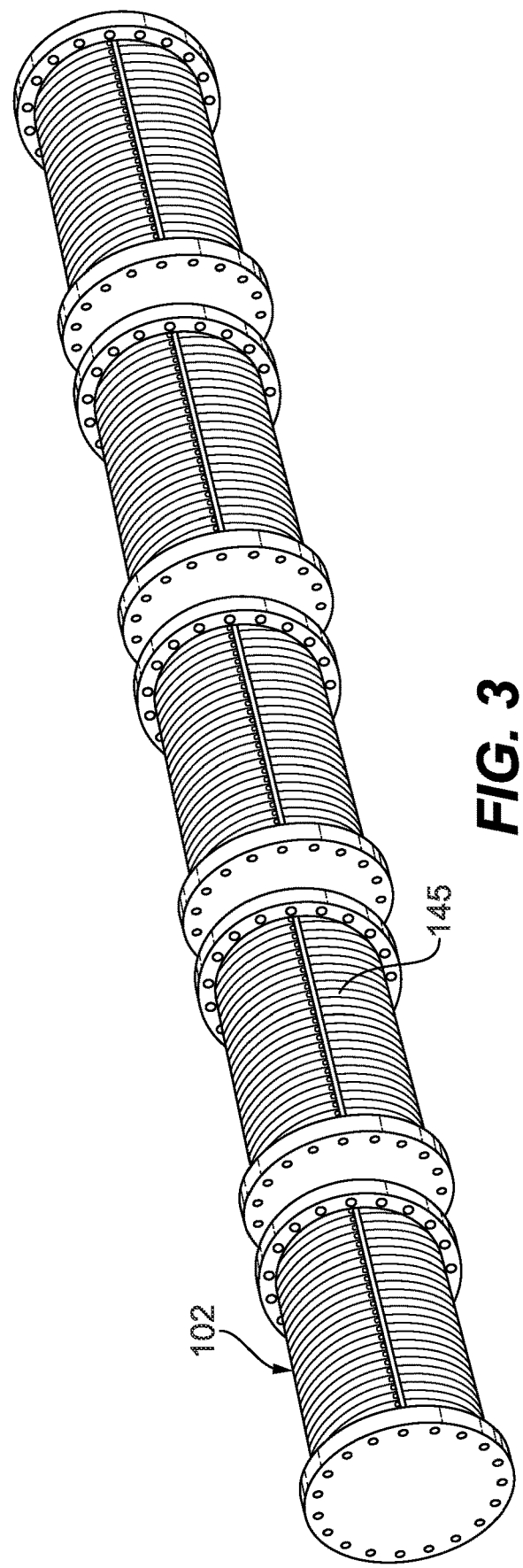
FIG. 3 is a schematic perspective view of another embodiment of a battery cell system constructed in accordance with the present disclosure, showing five stacks of cells.

As shown in FIG. 3, in accordance with high voltage applications, another embodiment of system 100 includes five stacks 102 of battery cells 104 in a given pod. Each stack 102 uses sufficient number of cells 104 connected in series to meet the system voltage requirement, and other strings or stacks of cells are electrically connected in parallel to respect the cell power limits and energy requirements of the application. For example, in one embodiment, a 520 volt stack can include 145 cells (for sake of clarity not all cells are shown stacked). With this modular set up, a single pod weighs about 1600 pounds and provides about 130 kWh. With two pods connected in series with a similar stack and cell quantity, 1040V and 260 kWh can be provided to a given load. Each cell stack 102 is modular in nature and the cell count within each stack can be adjusted to meet system voltage and capacity requirements. Cells 104 in a given stack can be replaced as-needed with new cells 104 and the electrodes (metallic conductors 134, 138) can be reused. In FIG. 3 the main BMS 106, housing 130, stack interface 114 and flow of the thermal loop is not depicted for sake of clarity, but it would be similar to that of FIG. 1A.

The methods and systems of the present disclosure, as described above and shown in the drawings, provide for more reliable, lighter weight, high-voltage power supplies that are scalable and modular for increased flexibility. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A battery cell system comprising:
   a plurality of battery cells having an annular shape abutting one another to form a battery cell stack with an annular shape to facilitate cooling;
   a stack interface having an annular housing operatively connected to the plurality of battery cells, wherein a cooling loop is defined about the battery cell stack and the stack interface and through central through holes of the battery cell stack and the stack interface; and
   a battery management system (BMS) having an annular housing operatively connected to the plurality of battery cells and stacked with the plurality of battery cells and the stack interface, wherein the battery management system includes a motor drive assembly positioned within an inner diameter hole of the annular housing of the battery management system, wherein the motor drive is configured and adapted to drive circulation of a heat transfer fluid.

2. The battery cell system as recited in claim 1, further comprising a first annular metallic conductor positioned at a first end of the battery cell stack and a second annular metallic conductor positioned at a second end of the battery cell stack.

3. The battery cell system as recited in claim 1, further comprising a plurality of sensors positioned within at least one of the battery cells.

4. The battery cell system as recited in claim 3, wherein the plurality of sensors includes at least one of a temperature sensor, a voltage sensor, and a pressure sensor.

5. The battery cell system as recited in claim 3, wherein the plurality of sensors are operatively connected to the BMS.

6. The battery cell system as recited in claim 1, wherein the battery cells are hermetically sealed.

7. The battery cell system as recited in claim 1, wherein the battery cell stack is a 520 volt stack and includes 145 battery cells.

8. The battery cell system as recited in claim 1, wherein the stack interface includes a plurality of heat dissipating field effect transistors (FETs).

9. The battery cell system as recited in claim 8, wherein the stack interface defines an inner perimeter and an outer perimeter, wherein the heat dissipating FETs are positioned more proximate to the outer perimeter than the inner perimeter and are circumferentially spaced apart along the outer perimeter.

10. The battery cell system as recited in claim 1, wherein the stack interface includes a mechanical switch device configured and adapted to selectively connect or disconnect one of the battery cell stack from an adjacent battery cell stack.

\* \* \* \* \*